July 12, 1966   B. A. GRUBER   3,260,571
BORON PHOSPHIDES

Filed Oct. 24, 1961   2 Sheets-Sheet 1

INVENTOR.
BERNARD A. GRUBER

BY Herman O. Bauermeister

July 12, 1966  B. A. GRUBER  3,260,571
BORON PHOSPHIDES

Filed Oct. 24, 1961  2 Sheets-Sheet 2

INVENTOR.
BERNARD A. GRUBER
BY *Herman O. Bauermeister*

3,260,571
BORON PHOSPHIDES
Bernard A. Gruber, Topsfield, Mass., assignor to Monsanto Company, a corporation of Delaware
Filed Oct. 24, 1961, Ser. No. 154,089
32 Claims. (Cl. 23—204)

This application is a continuation-in-part of applicant's copending application Serial No. 65,319 filed October 27, 1960, now abandoned, which is a continuation-in-part of applicant's copending application Serial No. 779,638 filed December 11, 1958 and now abandoned.

The present invention relates to new forms of boron phosphide, and methods for the production thereof.

It is an object of this invention to provide new forms of boron phosphide having a boron-to-phosphorus ratio of at least 6 to 1 which are characterized as rhombohedral crystalline, hard, thermally stable and chemically inert materials. It is a further object to provide new and highly abrasive, chemically resistant forms of boron phosphide which may be prepared in the form of granular, crystalline particles suitable for use as a semiconductor material. It is a still further object of this invention to provide a process by which hard abrasive products and also shaped structures such as refractory articles, chemical apparatus, turbine blades, and jet and rocket hardware items may be prepared from the new forms of boron phosphide.

Further objects and advantages of my invention will be apparent from the following description.

The novel forms of boron phosphide of the present invention may be produced to have a boron-to-phosphorus ratio of at least 6 to 1, the upper limit of this ratio approaching but not including elemental boron. A preferred material is the stoichiometric compound having the formula $B_6P$. The said chemical composition of matter defined above are extremely stable against high temperature heating, and against oxidation, particularly at very high temperatures.

It has been found that the boron phosphides described above may be prepared by a chemical reaction between elemental boron and elemental phosphorus, or in general, a boron source and a phosphorus source. It has also been found that the said boron phosphides may be produced by the thermal decomposition of the compound BP, and also by the reaction of the compound BP with elemental boron. Another method includes the reaction of a phosphorus halide with a boron halide in the presence of a reducing agent, e.g., hydrogen. Other methods which may be employed include the reaction of elemental boron with the compound phosphine. Another method which may readily be employed is the reaction of a phosphorus source as ferrophosphorus or crude phosphate ore together with a boron source exemplified by elemental boron, crude borax or other boron compounds in the presence of a reducing agent such as carbon. In this method the reaction is conducted in an inorganic matrix which is maintained in a molten condition in the temperature range of from 800° C. to 2100° C. Examples of suitable matrices include molten aluminum, magnesium, copper, titanium, chromium, manganese, vanadium, zirconium, molybdenum, tantalum, thorium, iron, nickel, lead, tin, antimony, bismuth and zinc. A preferred method of operation is to employ a temperature of from 1000° C. to 1600° C. for those matrices which are fluid in this range. In the broad or narrow temperature range a reaction occurs between the phosphorus which is present by addition of a phosphorus source such as ferrophosphorus or crude phosphate ores (which contain apatite, a calcium phosphate) together with a boron source, such as borax or other sodium compounds of boron and also including borides selected from the compound consisting of iron, magnesium, aluminum, copper, titanium, zirconium, and vanadium boride. A reaction occurs between the phosphorus and the boron with the resultant production of a boron phosphide having a boron-to-phosphorus ratio of at least 6 to 1. In the following tabulation the symbol $d(A.)$ represents the interplanar distances of the planes of the crystal. The designation of $I/I_0$ represents the relative intensity of the reflection from the said planes (the most intense line in the spectrum is always taken as 100 in this method of characterization):

$B_6P$

| $d(A.)$ | $I/I_0$ |
|---|---|
| 4.745 | 5 |
| 4.049 | 3 |
| 3.952 | 10 |
| 3.900 | 62 |
| 3.810 | 8 |
| 2.988 | 39 |
| 2.823 | 2 |
| 2.574 | 73 |
| 2.529 | 100 |
| 2.398 | 12 |
| 2.158 | 16 |
| 2.014 | *1 |
| 1.979 | 4 |
| 1.951 | 4 |
| 1.929 | 19 |
| 1.728 | 2 |
| 1.650 | 15 |
| 1.633 | 4 |
| 1.613 | 1 |
| 1.581 | 2 |
| 1.510 | 22 |
| 1.495 | 10 |
| 1.473 | 3 |
| 1.456 | *1 |
| 1.426 | 9 |
| 1.421 | 6 |
| 1.398 | 8 |

* Broad.

The above data represent the major peaks in the X-ray diffraction analysis. However, it is also feasible to define the structure by a condensation of the above to a summary of the stronger lines, as follows:

$B_6P$

| $d(A.)$ | $I/I_0$ |
|---|---|
| 3.952 | 10 |
| 3.900 | 62 |
| 3.810 | 8 |
| 2.988 | 39 |
| 2.574 | 73 |
| 2.529 | 100 |
| 2.398 | 12 |
| 2.158 | 16 |
| 1.929 | 19 |
| 1.650 | 15 |
| 1.510 | 22 |
| 1.495 | 10 |
| 1.421 | 6 |
| 1.398 | 8 |

The above structure is clearly different from that of the compound BP which has the following structural characterization:

| $d(A.)$ | $I/I_0$ |
|---|---|
| 2.63 | 100 |
| 2.28 | 19 |
| 1.61 | 30 |
| 1.37 | 19 |
| 1.31 | 3 |
| 1.14 | 2 |
| 1.04 | 6 |
| 1.02 | 4 |
| 0.928 | 6 |
| 0.871 | 6 |
| 0.803 | 3 |

The product of the present invention may be made in macro- or microcrystalline form. The inorganic melt method described below has the advantage that it can yield a product which is substantially completely micro in character (i.e., by quenching of the melt). This same inorganic melt process, however, may be modified by the use of long holding times to produce a macro product. The existence of such minute crystallite entities is shown by the line broadening effect observed in the X-ray diffraction analysis of the said crystalline materials. The said microcrystalline products are advantageously employed in a number of industrial applications, for example, as abrasives. It is an advantage of the present type of crystalline products and the process for producing the same that these very finely-divided and very hard materials are produced as the primary product of the reaction in a very finely-divided form.

In the preparation of compositions of the instant invention by the thermal transformation of the compound BP, such a process is preferably carried out at a temperature in the range of from 1000° C. to 1600° C. It has been found that it is desirable to conduct such a process under vacuum, although this is not an essential condition. When the vacuum method of operation is employed it has been found that a vacuum of from 1 micron to 500 mm. of Hg is desirable. It is obvious, of course, that the time of reaction is related to the temperature, thus the use of higher temperatures makes it possible for the transformation to be carried out more rapidly. The use of higher temperatures also permits the use of higher pressures for the same reaction rate. In general, the reaction time at a temperature of about 1200° C. is from 1 to 24 hours, depending upon the type of vacuum employed.

The embodiment of the invention in which the instant compositions are prepared by the thermal reaction of BP with elemental boron is conducted under temperature conditions similar to the conditions set forth in the preceding paragraph, i.e., at temperatures from 1000° C. to 1600° C. However, in this embodiment the use of a vacuum is optional, since the evolution of phosphorus in the thermal decomposition of the boron phosphide, BP, results in the immediate reaction of such evolved phosphorus with the elemental boron which is present and which thus reacts to produce the desired composition. The product of the present invention is a gray-black microcrystalline material of extreme hardness.

Methods of preparation of compositions of boron to phosphorus ratio greater than 6 to 1 include the reaction of elemental boron with elemental phosphorus; also the reaction of boron compounds such as boron trichloride or boron halide with phosphorus in the presence of hydrogen, or with phosphine. A variation of the above method for the preparation of a higher boron phosphide is to employ the phosphorus in a combined form as the starting material. For example, phosphorus trichloride (or any other halide of phosphorus) is charged to the reaction zone with hydrogen and the boron trichloride. A reduction takes place with the reaction of the phosphorus and boron, to yield the desired form of boron phosphide.

The criterion for the formation of these boron phosphides is that the system be maintained so that the partial pressure (phosphorus) be less than that of the decomposition pressure of BP at the ambient temperature.

Another method for the production of high crystalline boron phosphides is the reaction between a boron source and a phosphorus source occurring in a molten inorganic matrix. The phosphorus source such as a metal phosphide reacts with the boron source, such as a metal boride. The metal phosphides which are contemplated in the present invention are the aluminum, magnesium, copper, titanium, iron, chromium, manganese, vanadium, zirconium, molybdenum, tantalum, and thorium phosphides. However, it is also contemplated that a calcium phosphate, such as apatite, which is the principle constituent of most phosphate ores can also be employed with a reducing agent, such as carbon in the present method carried out in a molten metal or salt matrix. The boron source for the present reaction can be a boride, such as magnesium, aluminum, iron, titanium, zirconium or vanadium boride. Another boron source is boron carbide, while the crude boron ores, such as calcium borate (colemanite), magnesium borate or crude sodium borate (borax) are also boron sources in the present method.

As a result of the introduction of metallic components with either phosphorus and/or the boron source it is possible to conduct the present reaction in a matrix containing one or more of the metals of the group consisting of aluminum, magnesium, copper, titanium, chromium, manganese, vanadium, zirconium, molybdenum, tantalum, thorium, iron, nickel, lead, tin, antimony, bismuth, and zinc. The said matrix metal may be provided by the direct introduction of the said metal or by the formation of such metals from compounds thereof. For example, an iron-copper matrix is obtained from iron phosphide and copper. Furthermore, the iron phosphide and copper boride may be charged to a molten aluminum bath to provide a reaction matrix.

The present method conducted in an inorganic molten matrix may be controlled to yield either a macrocrystalline product or a microcrystalline product. It has been found that the use of a relatively high temperature for a prolonged period of time results in the development of larger crystalline particles, i.e., the macrocrystalline state. On the other hand, the use of relatively short reaction time and/or the use of lower temperature results in the production of a microcrystalline form of the higher boron phosphide. The microcrystalline type may also be transformed into the gross crystalline type of the macrocrystalline form by the use of heat treatment. For example, when the microcrystalline form is heated in an argon atmosphere at a temperature of 2000° C. for a period of 12 hours it is found that the structure is substantially entirely changed to a macrocrystalline form which upon X-ray diffraction reveals the structure defined above.

In the above general descriptions of the methods by which the boron phosphides of the instant invention may be prepared, the pressures employed range from one micron to one hundred atmospheres and the temperatures range from 800° C. to 2100° C. In any method used, however, the critical criterion is that the system be maintained so that the partial pressure of the phosphorus is less than that of the decomposition pressure of the compound BP at the ambient temperature.

As a further embodiment of the preparation of the boron phosphide of the instant invention, any boron phosphide prepared according to the above methods may be transformed into any specific desired boron phosphide having a still higher boron to phosphorus ratio by thermal decomposition under controlled conditions. For example, if it is desired to prepare the boron phosphide $B_{20}P$ (or $B_{70}P$ or $B_{100}P$, etc.) elemental boron and elemental phosphorus may be reacted under conditions of equilibrium to produce the stoichiometric compound hexaboron phosphide, $B_6P$. Thereafter, the $B_6P$ is thermally decomposed until it has undergone a definite phosphorus weight loss which is specific for $B_{20}P$ or any other higher boron phosphide desired. A more detailed description of the embodiments of this invention is given infra.

The following examples illustrate specific embodiments of the present invention:

*Example 1*

The transformation of the simple form of boron phosphide having the formula, BP, to the crystalline form having the formula, $B_6P$, was conducted by placing 100 g. of boron phosphide in finely-divided form in a graphite crucible in a porcelain tube located in an electric furnace. The porcelain tube was connected to a vacuum system which could be maintained at 50 microns pressure. The electric furnace was brought up to a temperature of 1200° C. and maintained constant. It was found that the evolution of phosphorus during a 12 hour period yielded a residual product having the formula of $B_6P$. Another experiment utilizing this method gave a product analyzing $B_{6.5}P$. It was also found that the starting material could be either amorphous BP or the cubic crystalline form of boron phosphide with the production of the same ultimate products.

The critical consideration required for the transformation of BP to $B_6P$ is that the system be operated such that the partial pressure (phosphorus) be less than that of the decomposition pressure of BP at the ambient temperature.

In the present example the operating pressure of the furnace and the temperature at which it is maintained were such that the transformation of BP to $B_6P$ was aided by permitting the evolved phosphorus resulting from the dissociation to be removed from the reaction zone (by means of the vacuum collection system). The temperature in the phosphorus collection zone was maintained at a relatively low value by the use of a water condenser, e.g., the pressure of the phosphorus source which was thus lower than the dissociation pressure (phosphorus) over the product, thus allowing the desired reaction to proceed.

After the processing described above, the product having the approximate formula $B_6P$ was found to be a gray powder of unusual hardness. It was found that the gray powder was harder than silicon carbide, and had a hardness on the Moh scale between 9.0 and 9.7.

X-ray diffraction analysis also detected the existence of a unique crystalline composition for the above samples and characteristic also of other samples having a boron-to-phosphorus ratio greater than 6 to 1 and characterized the "d" values and the corresponding intensity "$I/I_0$" earlier described.

*Example 2*

The same procedure described in Example 1 is followed except that the formed $B_6P$ is further heated until it has undergone an additional 22.61 weight percent loss. The resulting boron phosphide has the formula $B_{20}P$.

*Example 3*

Example 1 is repeated but this time the $B_6P$ product thus formed is further heated until it has undergone a further loss of 27.45 weight percent. The resulting boron phosphide has the formula $B_{40}P$.

*Example 4*

Example 1 is again repeated, but the $B_6P$ is heated further until it has undergone a weight loss of 29.53 weight percent. The resulting boron phosphide has the formula $B_{70}P$.

*Example 5*

Example 1 is again repeated, but this time heating is continued until the $B_6P$ has undergone a weight loss of 30.36 percent. The product was $B_{100}P$.

*Example 6*

The reaction of elemental boron with elemental phosphorus for the production of $B_6P$ was carried out by charging 0.4176 g. of amorphous boron into a graphite crucible which had been prepared by drilling a 5/16" hole in a cylindrical piece of ½" graphite rod. The charged crucible was placed into a ¾" O.D. ceramic tube 10" long, closed at the end nearest the sample. One-half of this ceramic tube was located in a high temperature furnace, while the other end was placed in an adjacent low temperature furnace, without any cold zone between the two furnaces.

The other end of the ceramic tube was then charged with 1.976 g. of amorphous red phosphorus, after which the tube was evacuated and sealed.

The tube was located in the two adjacent furnaces which were then gradually brought up to the desired temperature. The hot end was maintained at a temperature of 1100° C. while the temperature of the phosphorus end was maintained at 111° C. to volatilize the phosphorus and to maintain a phosphorus partial pressure of about 100 microns.

The heating of the reaction system caused the phosphorus to vaporize with the result that the phosphorus vapor filled the entire tube at the desired pressure. The phosphorus vapor then reacted with the hot boron contained at the other end of the tube. It was found that at the end of a heating period of about 24 hours, that the boron had been transformed substantially completely to the compound $B_6P$. A similar experiment conducted at 1200° C. was also found to give a substantially quantitative yield of $B_6P$. In general, as is shown in the curve of FIG. 1, which represents equilibrium conditions for the production of $B_6P$, the pressure which yields the desired $B_6P$ instead of BP is in the region below the line XY. Thus, at 1000° C. a pressure of 100 microns gives $B_6P$ while a pressure of 1570 microns gives BP.

In the present example the use of a shaped charge of starting material, i.e., the boron located in the drilled cavity in the graphite crucible resulted in the production of a similar and identically shaped product of $B_6P$. This shaped article was found to be stable at high temperatures.

The $B_6P$ product was found to have a bulk density of 2.45. However, the ultimate density of individual homogeneous particles varies between 2.60 and 2.72. In contrast, cubic BP has a theoretical X-ray density of 2.97.

In this example, as in the preceding example, the condition of the formation of $B_6P$ is that the system be operated such that the partial pressure (phosphorus) is less than that of the decomposition pressure of BP at the ambient temperature.

*Example 7*

The same procedure described in Example 6 is repeated, but this time 67.65 g. of boron are reacted with 9.6 g. of phosphorus. The resulting product is the boron phosphide having the formula $B_{20}P$.

*Example 8*

Example 6 is again repeated but here 4.84 g. of phosphorus is reacted with 67.65 g. of boron. The resulting product is $B_{40}P$.

*Example 9*

The procedure described in Example 6 is repeated but only 2.76 g. of amorphous red phosphorus is reacted with 67.65 g. of elemental boron. The resulting product is $B_{70}P$.

*Example 10*

The procedure described in Example 6 is repeated but only 1.94 g. of phosphorus is reacted with 67.65 g. of boron. The product is the boron phosphide $B_{100}P$.

*Example 11*

The production of the compound $B_6P$ from boron phosphide, BP, reacted with excess elemental boron was carride out at a series of temperatures about 1000° C. The BP was employed as a finely-divided crystalline powder, while the boron was also in a finely-divided form of less than 100 mesh particle size. The two components were mixed and charged to a graphite crucible having an integral and external element which fitted loosely together with the space between the two portions forming a nose cone such as was adaptable for use in a rocket. The intimately mixed combination of BP and elemental boron (5 moles of boron per mole of boron phosphide)

was heated to a temperature of 1300° C. for a period of 12 hours in an inert gas atmosphere. At the end of this time the charged crucible was cooled and the test piece removed. It was found that the boron phosphide had been transformed substantially completely to a crystalline $B_6P$ product which was very hard and thermally stable.

*Example 12*

The procedure described in Example 11 is repeated, but this time 19 moles of excess boron per mole of boron phosphide is used. The product is the boron phosphide $B_{20}P$.

*Example 13*

The procedure described in Example 11 is again repeated, but here a 39 molar excess of boron over BP is used. The result is a boron phosphide having the formula $B_{40}P$.

*Example 14*

The procedure described in Example 11 is again repeated, but here a 69 molar excess of boron over BP is used. The boron phosphide resulting has the formula $B_{70}P$.

*Example 15*

The same procedure described in Example 11 is again repeated, but a molar excess of boron of 99 to 1 over the BP produces the boron phosphide $B_{100}P$.

*Example 16*

The formation of $B_6P$ by the reaction of boron trichloride, $BCl_3$, as the boron source and elemental phosphorus as the phosphorus source in the presence of hydrogen was carried out by introducing the respective reactants into a reactor from the respective gas phases. The elemental phosphorus was provided by bubbling a stream of hydrogen through a heated pool of phosphorus, yellow form. The gas heated with phosphorus was directed into a heated reaction vessel, into which gaseous boron trichloride was also flowing. At temperatures of 1100° C. the reaction between the $BCl_3$ and the phosphorus results in the formation of the crystalline product $B_6P$. However, it is essential that the conditions be such that the partial pressure (phosphorus) be less than that of the decomposition pressure of BP at the ambient temperature.

*Example 17*

The same procedure described in Example 16 is repeated, but the amount of $BCl_3$ is increased to a 20 to 1 ratio over the elemental phosphorus. The product is $B_{20}P$.

*Example 18*

The same procedure described in Example 16 is again repeated, but here the $BCl_3$-P ratio is increased to 40 to 1. The boron feed from the $BCl_3$ reacts with the phosphorus to produce the boron phosphide $B_{40}P$.

*Example 19*

The procedure described in Example 16 is again repeated, but the $BCl_3$ ratio to phosphorus is increased to 70 to 1. The product is $B_{70}P$.

*Example 20*

Example 16 is repeated, but this time 100 molar excess of $BCl_3$ is reacted with phosphorus. The resultant product is $B_{100}P$.

*Example 21*

The production of $B_6P$ by the reaction of elemental boron as the boron source in solid form with phosphine, $pH_3$, as the phosphorus source supplied in gas form was conducted in a ceramic tube located in an electric furnace. A 10 g. sample of elemental boron held in the furnace for a period of 12 hours with the continuous passage of phosphine over the boron was found to result in a substantially complete transformation to $B_6P$. The necessary condition for the reaction was that partial pressure (phosphorus) be less than that of the decomposition pressure of BP at the ambient temperature.

This method was also found to yield the desired $B_6P$ by the reaction of the said elemental solid form of boron with elemental phosphorus carried in an inert gas stream, preferably hydrogen, although argon or nitrogen can also be used.

In like manner, other boron phosphides, e.g., $B_{40}P$, $B_{70}P$, and $B_{100}P$ are prepared by increasing the quantity of available boron and observing the stated condition for the reaction.

*Example 22*

The formation of $B_6P$ in an inorganic melt was carried out by the reaction of crystalline boron phosphide with a 10 molar excess of elemental boron. This reaction was carried out in a ferro-melt by first forming boron phosphide from ferro-boron and ferrophosphorus. This resulted in the production of a finely dispersed form of boron phosphide in the molten iron matrix. The 10 molar excess of elemental boron was then stirred into the molten reaction medium. This was maintained at a temperature of 1400° C. for a period of 24 hours. At the end of this time the reaction mass was cooled, after which the iron content was removed by solution in sulfuric acid. The residual insoluble sludge was then washed, treated with hydrofluoric acid and the crystalline form of $B_6P$ recovered as the ultimate product. The criterion for the formation of the $B_6P$ is that the system be operated such that the partial pressure (phosphorus) be less than that of the decomposition pressure of BP at ambient temperatures greater than 800° C. throughout the entire process.

In like manner, higher boron phosphides, e.g., $B_{20}P$, $B_{40}P$, $B_{70}P$, $B_{100}P$, etc. are prepared by increasing the amount of available boron and observing the stated criterion for the reaction.

The inorganic melt method (e.g. using iron or nickel as the matrix) for producing the present boron phosphides, particularly with longer holding times, has been found to yield a single crystal product which is particularly useful in electrical applications.

The following examples illustrate that embodiment of this invention wherein boron phosphides having higher boron-phosphorus ratios are obtained by thermal decomposition of boron phosphides of lower boron-phosphorus ratios prepared by the foregoing methods. For these examples the phosphorus weight loss is determined by the use of any one of several various commercially available weight-loss measuring devices, e.g., quartz spring balances, ordinary spring balances or strain gauges used in conjunction with a cathetometer. The quartz balance is preferred and is used in the following examples:

*Example 23*

A sample of hexaboron phosphide, $B_6P$, as prepared by any of the methods of Examples 1, 6, 11, 16, 21 or 22 above having a boron content of 67.65 weight percent and weighing 100 g. was placed into a graphite container. The graphite container was then suspended to a coiled quartz spring attached to the inside of a quartz container which enclosed both the quartz spring and graphite container and which also had openings for introduction of an inert gas into and out of the quartz container and a vacuum seal. The hexaboron phosphide sample was heated to 1525° C. by means of a platinum wire furnace surrounding that portion of the quartz container in which the graphite container was located, while the upper portion of the quartz container in which the quartz spring was located and the lower portion of the quartz container below the graphite container was heated to 600° C. with ordinary furnaces. Argon, was then introduced into the quartz container at 1 atmosphere pressure and a flow rate of about 7.5 cc./min. Heating of the hexaboron phosphide sample was continued until, by means of a cathetometer reading on an indicator located on the quartz spring, the sample had lost 12.92 weight percent. The sample was immediately cooled and analyzed. The product had 77.74 weight percent boron and 22.26 weight percent phosphorus corresponding to a boron phosphide having the formula $B_{10}P$.

*Example 24*

The same procedure as described in Example 23 was followed except that the heating was continued for 100 minutes. A cathetometer reading indicated a weight percent loss of 22.61. The product was found to contain 87.48 weight percent boron and 12.52 weight percent phosphorus corresponding to a boron phosphide having the formula $B_{20}P$.

*Example 25*

The procedure described in Example 23 was followed but heating was continued for 370 minutes at which time a cathetometer reading indicated a weight percent loss of 27.45. The product corresponding to the formula $B_{40}P$ was cooled and recovered.

*Example 26*

The same procedure described in Example 23 is repeated, but the starting material was the boron phosphide $B_{20}P$, prepared in accordance with any of the methods in Examples 2, 7, 12 or 17 supra. The $B_{20}P$ was heated at a temperatture of 1525° C. until, by means of a cathetometer reading on an indicator located on the quartz spring wire, the $B_{20}P$ sample had lost 8.94 weight percent. The sample was immediately cooled and recovered. The product was the boron phosphide $B_{70}P$.

*Example 27*

The procedure described in Example 23 is repeated, but the boron phosphide $B_{70}P$ prepared according to any of the methods recited in Examples 4, 9, 14 or 19, is used instead of $B_6P$. The $B_{70}P$ is heated until the cathetometer reading indicated a weight percent loss of 1.18. The product is cooled and recovered and consists of 97.22 weight percent boron and 2.78 weight percent phosphorus corresponding to the formula $B_{100}P$.

The present invention will be more fully understood by reference to the accompanying drawings which form a part of the instant invention.

Figure 1:
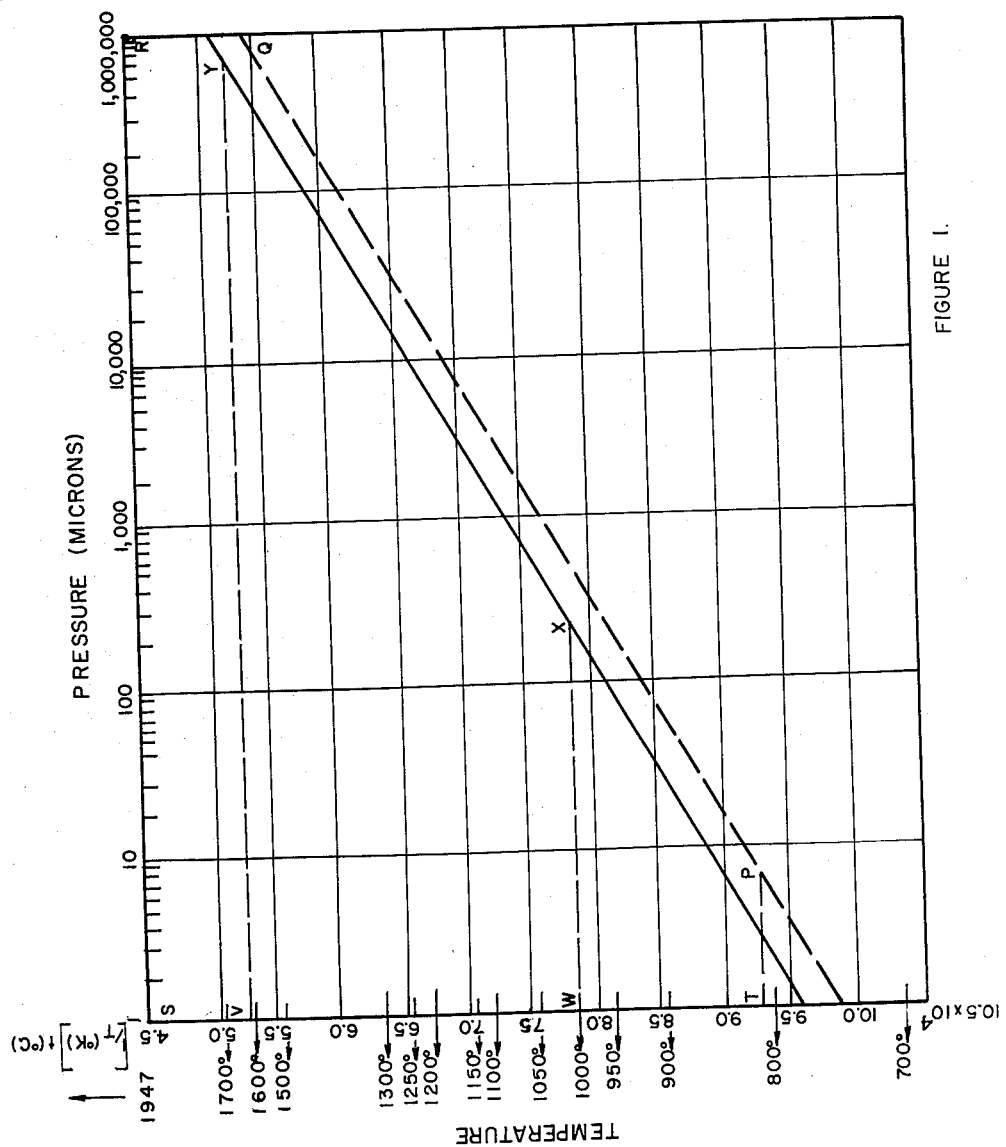
FIGURE 1 is a graph showing the relationship between the process operating region for the production of the higher crystalline boron phosphides of this invention, typified by $B_6P$, and the prior art material BP.

It will be appreciated from the foregoing examples and with reference to FIGURE 1 that any specific boron phosphide having a boron to phosphorus ratio of greater than 6 to 1 may be prepared according to the instant invention.

FIGURE 1 shows the relationship between the compound BP and $B_6P$, which is representative of the boron phosphides having a boron-to-phosphorus ratio of at least 6 to 1. This graph represents the equilibrium conditions for the formation of $B_6P$. Equilibrium graphs for the higher boron-phosphides are similar within the temperature range of 800° C. to 2100° C. and pressures ranging from 1 micron to 100 atmospheres. It should be noted, however, that boron phosphides higher than $B_6P$ are also obtained within the $B_6P$ region described in FIGURE 1, under non-equilibrium conditions, as long as the partial pressure of phosphorus is less than the decomposition pressure of the compound BP at the ambient temperature. FIGURE 1 shows a plot of the straight lines XY and PQ, expressing the relationship between the partial pressure of phosphorus in the reaction zone relative to temperature (°C). The pressure is plotted on a logarithmic scale, while the temperature is plotted as a reciprocal of degrees Kelvin $1/T$. (°K.)$\times 10^4$ as a uniform scale and also as a direct reading of degrees centigrade (non-uniform scale). $B_6P$ is formed within the region below the line PQ, while BP is formed under conditions above that line.

In general, as shown in FIGURE 1 the preferred operating region for the production of $B_6P$ is within the region designated VWXY.

The materials of the instant invention have dissociation pressures of less than 100 microns at temperatures in excess of 1200° C. This is indicative of a high order of stability at elevated temperatures. For this reason, the materials of this invention are suitable for use in devices having high temperature applications. The materials of this invention are thermally stable up to 2000° C. whereas the compound BP is thermally stable at only 1000° C. As an illustration of the comparative thermal stability of the compounds BP and $B_6P$ (representative of the new boron phosphides) when BP is heated at 1100° C. under 100 microns pressure it immediately begins to decompose until after about 40 hours the BP is completely transformed into $B_6P$. At 1200° C. and 100 microns pressure, BP decomposes still more rapidly until after about only 3 hours it is transformed completely to $B_6P$. $B_6P$ on the other hand is thermally stable at 1200° C. and 100 microns pressure. It will be seen that the higher boron phosphides of the instant invention are clearly superior to the compound BP from the standpoint of thermal stability. At temperatures above 1000° C., BP evolves phosphorus copiously resulting in a deleterious atmosphere of phosphorus on and around the device components which is corrosively destructive of the operation thereof. Coincidental with this evolution of phosphorus is a physical breakdown of the BP component due to a collapse of its cubic crystalline structure. On the other hand, the higher boron phosphides described herein are rhombohedral and not cubic crystalline in form, hence, even when phosphorus is lost (at temperatures much higher than 1000° C.), there is no physical breakdown of devices using this material as a component. Since there is much less phosphorus relative to boron in the instant boron phosphides, than in BP, there is less phosphorus to evolve into a deleterious atmosphere of phosphorus around the device components. As a consequence, the boron phosphides described and claimed herein are far superior to BP, being operable at higher temperatures for longer periods of time with less danger of corrosion and physical breakdown.

The novel compositions of the present invention existing in crystalline form are extremely hard which makes the present products useful for abrasive purposes, since the material already exists in a very finely-divided form. Another advantage in the use of such microcrystalline products is in the dispersion hardening of metals and alloys. For example, the very finely-divided crystalline products are milled or admixed with finely-divided metals or oxides of iron, nickel, cobalt, etc. The boron and phosphorus which is in admixture with the finely-divided metal or oxide is then subjected to a consolidation treatment, such as thermal sintering which may also accompany a reduction treatment in the case of readily oxidizable metals or of oxide as the starting material. This reduced material is then subjected to extrusion or other mechanical treatment in order to obtain an extremely dense and strong metal in which the novel form of boron phosphide exists as the dispersing agent serving to strengthen the metal products.

The crystalline nature of the present materials is also an aid in other fabrication operations either of the said novel form of the boron phosphide employed alone, or in admixture with other metals, or oxides, for example, in hot pressing or in electrophoretic methods. The very fine material thus results in the production of a finer grain of the ultimate product which consequently is harder and possesses a higher tensile strength than would otherwise be possible.

In the fabrication of various refractory articles such as chemical apparatus, turbine blades and rocket missiles comprising the new compositions, the process preferably begins with the use of a finely-divided form of this compound. The granular powdered material is molded into the desired shape and is then sintered, preferably in an inert atmosphere in order to consolidate the particles into the desired shape.

The hot pressing technique may also be employed in order to fabricate shaped articles from these forms of BP. In this method the starting material, in powder form is placed in a die of the desired shaped and subjected to an elevated temperature, for a sufficient time to consolidate the crystalline material and to permit crystal growth. The pressure employed in this method is generally from 500 to 20,000 p.s.i. A flux or bonding agent may also be employed in this relationship; suitable materials for this purpose include one or more of the metals; boron, iron, nickel, cobalt, chromium, niobium, tantalum, titanium, zirconium, tungsten, molybdenum, and hafnium; and the oxides alumina, zirconia, hafnia, silica, beryllia, titania, thoria, as well as combinations of the oxides and combinations within the said metals. Inorganic compounds having fluxing or bonding properties, such as the borates or phosphates, e.g., the alkali borates and phosphates may also be employed. Boron phosphates may also be utilized as a bonding agent which forms a glassy matrix having the property of securing the crystalline particles of these stabilized boron phosphides. Another additive which may be employed in the pressing operation is asbestos, since it has been found that when the composite article is later subjected to a vacuum heating or oxidizing condition such as a combustion gas flame, the asbestos is burned out or fused, leaving the new boron phosphide which is of utility in the use of sweat or transpiration cooling described infra.

The porous form of crystalline boron phosphides are also of utility in the fabrication of parts for sweat or transpiration cooling. This method is employed for cooling missile, rocket or space ship external and internal surfaces, such as nose cones, control surfaces, feed lines and combustion chambers which are subjected to high temperatures. The objects having a porous wall comprising such crystalline boron phosphide permit the exudation of a liquid, such as water, alcohol or the liquid fuel through the porous wall so that the liquid, upon passing through the porous boron phosphide is evaporated to provide an unusually efficient cooling effect.

The above-described porous form of fabricated boron phosphide, is also of utility as a filter element, particularly for corrosive liquid and gas uses. Thus, in the fuel system for a rocket or missile, it may be necessary to filter the fuel and/or oxidizing agent in order to avoid clogging of corrosive agents, such as fuming nitric acid which attacks most metals. However, when a porous boron phosphide filter is inserted in the fuel or oxidant line, this filtering effect is readily accomplished without the danger of corrosion or dissolution of the crystalline boron phosphide.

In the hot pressing operation it may also be desirable to control phase changes of these new boron phosphides by the use of specific additives. For example, transition temperature changes may be controlled by the addition of silicon carbide, zinc oxide and other crystalline materials to aid in the pressing operation.

Cold pressing or indenting of the new crystalline boron phosphides is another fabrication method which may be employed, particularly with the use of a binder such as carboxymethyl cellulose for the fabrication of various parts and fittings. The pressure utilized in cold pressing may be up to 200,000 p.s.i. Suitable metallic additives which may be employed, together with the boron phosphide, include iron, nickel, cobalt, chromium, niobium, tantalum, titanium, zirconium, tungsten, molybdenum and hafnium, while refractory and insulating oxides, such as alumina, zirconia, hafnia, silica, beryllia, titania, and thoria, may also be employed singly or in combination, including combinations with the said metals. The cold pressed material is subsequently treated in various ways, such as by sintering, reducing or partially oxidizing the fabricated article, in which case the boron phosphide may also undergo a number of controlled modifications. Cold pressing also permits the development of porosity, such as by the employment of additives exemplified by naphthalene and other organic compounds, as well as cork and asbestos, since the heating and oxidation result in the burning out or transformation of such binder constituents to a glassy or crystalline matrix, which together with the change in the said metals or oxide constituents serves to secure and bond the orthorhomic boron phosphide particles.

It is also an embodiment of the invention to form fabricated and shaped parts of new boron phosphides by beginning with boron as the powdered or crystalline material which is shaped or pressed to the desired form such as by consolidation effected by heating. The boron is then treated with phosphorus vapor or a phosphorus yielding compound such as phosphine. As a result of such reaction the shaped piece is transformed into a body of boron phosphide having the formula BP. In order to obtain the desired high temperature, stable form of boron phosphide, the intermediate fabricated article of BP is then heated to a temperature of from 800° C. to 2100° C. or preferably from 1000° C. to 1600° C. Such heating may be carried out in vacuum, although it is also desirable in certain circumstances to avoid the use of vacuum. In such instances, it is often desirable to employ an inert gas such as nitrogen, helium, or argon which is swept through the shaped piece during the heating step.

In the transformation of a shaped article or individual particulate forms of boron phosphide, BP, to the form having a boron-to-phosphorus ratio of at least 6 to 1, the phosphorus vapor is evolved. This phosphorus vapor may be collected and utilized in other processing, for example, in the above-described fabrication of intermediate articles of BP obtained by the reaction between elemental boron and phosphorus vapor.

If a minor proportion of elemental boron is employed as an additive with the crystalline boron phosphide in either hot pressing or cold pressing, the fabricated part may be subjected to a phosphorization treatment in which the piece is subjected to the vapor of elemental phosphorus or another phosphorus compound, for example, phosphine in order to consolidate the fabricated part with the transformation of the boron binding agent to boron phosphide within the above ratio.

In order to achieve a final crystalline boron phosphide product, it is also feasible to employ starting materials other than crystalline boron phosphide. For example, the desired piece of fitting may be fabricated from a particulate form of elemental boron. This material is then reacted with elemental phosphorus in the vapor phase to form a boron phosphide, having a boron-to-phosphorus ratio of at least 6 to 1 in situ. Other reactive starting materials which may be employed for a chemical transformation of the fabricated part include aluminum phosphide as the starting material. This material which may be employed in a pulverulent form to make a crude prototype of the desired part is then reacted with boron trichloride and hydrogen at an elevated temperature to transform the shaped piece into the desired crystalline boron phosphide, with the evolution of aluminum chloride in vapor form as a by-product.

Other starting materials which are available to yield the instant crystalline boron phosphides as the ultimate product include the combination or gaseous streams of boron trichloride and phosphine which react to deposit crystalline boron phosphide. In this relationship it is possible to make use of vapor phase deposition or impregnation of various shaped pieces, for example, graphite, molybdenum, tungsten, steel or ceramic base (e.g., porcelain or aluminum), prototype which are then coated or impregnated with the desired thickness or depth of boron phosphide. Another method which is available for such vapor phase deposition between gaseous boron reactants such as boron halides, hydrides and boron alkyls with elemental phosorus and hydrogen. These three components when reacted in the gas phase at high temperatures yield the desired crystalline boron phosphides.

If it is desired to make use of the new crystalline form of boron phosphides as a hardening element in a metallic base, for example, iron in the production of a wear plate, the boron phosphide may be produced directly in such a metallic matrix. The base metals which may be employed in this relationship include the group of aluminum, magnesium, copper, titanium, chromium, manganese, vanadium, zirconium, molybdenum, tantalum, thorium, iron, nickel, lead, tin, antimony, bismuth and zinc. Articles of this type are useful to withstand wear and abrasion, such as in the manufacture of a chute for sand or other materials. Another use for such a reinforced metal is as a baffle in a steam turbine. The above-described process for the reaction of a phosphorus source, such as ferrophosphorus and a boron source such as ferroboron at elevated temperature results in the production of the desired crystalline form of boron phosphide, having a composition defined above which is obtained in dispersed form in the iron matrix.

Pack diffusion is another method for applying the new crystalline boron phosphides to desired metallic or ceramic parts. In this method, particles of the crystalline boron phosphide are packed around the desired metallic or ceramic parts and the entire mixture subjected to a high temperature, e.g., about 1500° C. to 6000° C. for a suitable period of time to enable diffusion of the boron phosphide to take place into the desired parts and fittings.

If it is desired to coat or plate the new crystalline boron phosphides on various substrates of metal or refractory parts, particularly when intricate sections are involved, a flame spraying technique is desirable. In this method, a high temperature flame such as a reducing oxy hydrogen flame is provided with finely-divided particles of the new crystalline boron phosphides so that the impingement of the flame upon the desired prototype base parts of metals or refractory coats the parts with a uniform and dense deposit of the crystalline boron phosphide.

Another method which may be applied is the deposition of a coating of the new crystalline boron phosphide by electrophoresis. This method is particularly suited for precision coating of complicated shapes. Metals and oxides selected from the group consisting of iron, nickel, cobalt, chromium, niobium, tantalum, titanium, zirconium, tungsten, molybdenum and halfnium and the oxides alumina, zirconia, hafnia, silica, beryllia, titania, thoria, as well as combinations of the oxides and combinations with the said metals may also be applied in combination with the new crystalline boron phosphide by the electrophoretic method. In this process an aqueous suspension of the crystalline boron phosphide and the desired metal or oxide is prepared preferably with particle size ranges of from 1 to 10 microns. A suspending or dispersing agent, such as carboxymethylcellulose may also be present. The suspension preparation is then deposited upon the prototype of graphite, a metal or a fine screen metal form utilizing a plating voltage of the order of 6 to 100 volts direct current. A uniform coating of the boron phosphide optionally with a metal and oxide therewith of the group set forth above, is thus applied to the base prototype. The coating is subsequently air dried and is then treated by a low temperature hydrogen reduction in the case of the metallic oxides. Hydrogen reduction is not necessary with coatings of the metal powders, and the boron phosphide is unaffected by such treatment. The electrophoretic coating is next densified by peening, rolling or by isostatic pressing, the latter method being particularly convenient for small items. A final step after densification is a sintering of the coating to provide a uniform and strong coating which is resistant to chemicals and to abrasion.

A mechanical method of deposition which is available for the fabrication of external layers of the new crystalline boron phosphides is that of slurry deposition. In this method the finely-divided crystalline boron phosphide is dispersed in a liquid vehicle such as water, optionally with a dispersing or suspending agent such as carboxymethylcellulose. Additive materials, such as metals, for example, iron, nickel, cobalt, chromium, niobium, tantalum, titanium, zirconium, molybdenum and hafnium and finely-divided refractories, e.g., alumina, zirconia, hafnia, silica, beryllia, titania, and thoria may also be present.

The forms which the slurry is to be deposited are made with a porous structure, for example, from metal powders which have been loosely consolidated to the desired shape or by the use of a fine mesh screen form having the shape of the desired object. Such a porous prototype is suspended in the liquid vehicle which is then subjected to high pressures of the order of 10,000 to 50,000 pounds per square inch. Provision is made for the liquid vehicle to be removed from the interior of the mold or prototype piece which may have an intricate form, or may consist of a simple flat plate as may be desired. As a result of the imposition of pressure upon the dispersion of the crystalline boron phosphide, the slurry is uniformly pressed against the prototype with the result that an interlocking crystalline structure is obtained without internal voids or bridges. When the desired thickness of the crystalline boron phosphide has thus been formed, the coating may be subjected to further mechanical treatment. For example, the coating thus obtained by slurry dispersion may be densified by peening, rolling or isostatic pressing. Finally the deposited coating of crystalline boron phosphide together with any additives is sintered to consolidate the coating to a dense form.

Another method of fabrication which is of utility in forming bodies from the above described crystalline boron phosphides is the slip casting technique. In this method a slurry is made of the crystalline boron phosphide, together with an desired additive material, such as finely-divided refractories, e.g., alumina, zirconia, hafnia, silica carbide, beryllia, titania, and thoria. This mixture is then used in conventional ceramic slip casting techniques to obtain the desired shapes and fittings in a green form which is then fired, packed and sintered to consolidate the crystalline particles.

In general, fabricated articles having a crystalline boron phosphide coating having a boron-to-phosphorus ratio of at least 6 to 1 or plating may be formed upon metallic or non-metallic bases, used as solid, mesh or reinforced forms. Examples of non-metallic materials as the substrate include quartz, silicon carbide and ceramic compositions such as porcelain and various types of glass.

Among the chemically resistant and thermally refractory fittings which are contemplated in the present invention are complete vessels, and also liners for fuel tanks and other vessels. In this relationship, the new crystalline boron phosphides are particularly desirable, since it is not attacked by any known liquid reagent, therefore withstands the corrosive action of fuming nitric acid, aqua regia and other mineral acids, as well as basic materials, such as hydrazine.

Fittings and elements of rockets and missiles comprising the new crystalline boron phosphides are unusually effective in withstanding the severe conditions which are encountered in operation. For example, the nose cones are subject to the phenomenon of "ablation," i.e., the melting or burning of the nose cone together with a violent abrasion or tearing off of pieces of the cone because of the high velocity flow of the atmosphere past the cone. Nose cones comprising the new crystalline boron phosphides are more resistant than conventional materials in withstanding this great velocity.

Other elements of typical missiles, rockets, and jet planes which are readily fabricated from the present crystalline boron phosphide are elevators and also tail cones.

Rocket propulsion systems, whether based upon the use of liquid or solid propellants, require the production of a large volume of exit gases at a very high temperature. This is a necessary condition in order to achieve the very high speed necessary to drive such a rocket or missile. Combustion temperatures of the order of 3000 to 5000° F. must therefore be controlled with the further requirement that corrosive reactants and reaction products may also be present as discussed above. It has been found that the present crystalline boron phosphides are extremely desirable as combustion zone liners or blast tubes for rockets, missiles, space ships and jet engines. An example of this type of removable combustion liner is the ram jet engine in which a hollow, tubular section serves as the combustion zone for liquid reactants which are fed into such zone, vaporized therein with a tremendous expansion in volume to the gaseous state, and discharged at a high velocity in order to propel the ram jet.

It is an advantage of the present invention that curved shapes may readily be manufactured in a form which is characterized by high strength. The production of the crystalline modification of boron phosphide, described herein, results in an article of manufacture having a gross structure of the particles which provides interlocking of the crystallites. This is particularly useful in the fabrication of curved shapes, since the interlocking of the crystallites results in the production of a smooth, curved surface. This effect is advantageous in the fabrication of fittings and parts which must overcome great thermal stress and shock. Therefore, the curved shapes which are made by the present invention are desirable in providing an extremely strong coherent material which may be formed with particles of the new crystalline boron phosphide having substantially the theoretical density of this material.

The crystalline boron phosphides described herein, are extremely resistant to chemical attack as well as radiation so that parts may be comprised of crystalline boron phosphide in rockets, missiles and space ships which employ nuclear energy, for example, in the employment of a high intensity source of nuclear fission or fusion which supplies energy for the operation of such missiles and other devices.

The hardness of these new boron phosphides which corresponds to a value between 9.0 and 9.7 on Moh's scale of hardness (diamond being 10) also makes this crystalline modification a very useful material for bearings and impellers of fuel pumps employed in rocket engine propulsion systems. In the launching of a missile or rocket it is often necessary to pump several thousands of gallons of a liquid fuel, and a oxidizing agent to the combustion zone in a period of a few minutes. Since the space and weight available for a fuel pump is very small, the fuel pump must operate under extremely difficult conditions, such as very high rotative velocities of the impeller. Large amounts of heat are therefore developed under these extreme operation conditions and it has been found that failure of conventional metallic pump impellers may readily occur. For this reason the extreme strength and corrosion resistance of the instant crystalline boron phosphide make it desirable to employ these materials in the fabrication of solid pump impellers or as a coating material on bases of molybdenum or other refractory materials. Since the high rotative speeds of the pump also result in the development of considerable heat in the bearings of the pump, it has been found desirable to employ this crystalline modification of boron phosphide as the bearing material in such heavy duty high capacity pumps for rocket propulsion systems.

The control surfaces of missiles, rockets, and space ships may also be improved by constructing such fittings and hardware using the present crystalline form of boron phosphide. For example, the jet elevators, also called jetevators, which are used to direct a rocket by controlling the direction of the exhaust combustion gases from a rocket exhaust may be subjected to very high temperatures. It has been found that conventional metals, such as tantalum, as well as typical refractories, for example, alumina and zirconia, are ineffective in this relationship because of poor thermal shock resistance and low strength when subjected to hot corrosive combustion gases, fly ash and other combustion reaction products which leave the combustion zone at high velocities of the order of hypersonic values, such as from 5 to 10 Mach numbers, e.g., above 3000 m.p.h. Even graphite is not practical for this purpose, since this material is subject to erosion by the gas stream. Since these jet elevators and vanes must be located directly in the exhaust gas stream in order to direct and control the same for the navigation of a rocket or missile, it is advantageous to utilize the high thermal strength properties of the new boron phosphides for this purpose. The jet elevator parts may be based upon the use of solid boron phosphide in a fabricated form or may be composed of an external layer of the crystalline boron phosphide upon a base form of graphite, molybdenum, or other refractory material. Such fittings are able to withstand temperatures of several thousand degrees Fahrenheit, and therefore represent a solution to this difficult problem.

The following examples illustrate further specific embodiments of the present invention:

Example 28

Figure 2:
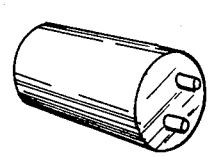
FIGURE 2 shows a perspective view of a fuel tank suitable for use in a rocket or missile and having an inlet and outlet line provided in one end of the cylindrical form of the said tank.

A fuel tank form for a rocket, such as is shown in FIGURE 2, is fabricated from stainless steel and is provided with relatively large inlet and outlet openings in one end of the cylindrical body. The stainless steel form is placed in an electrical furnace and raised to a temperature of about 1200° C. A 0.985/0.015 molal mixture of boron trichloride-phosphine at a total pressure of one atmosphere is introduced into an opening of the vessel. It is found that a chemical reaction occurs with the deposition of boron phosphide, approximately $B_6P$ as an internal lining which covers the stainless steel to provide a corrosion-resistant layer which withstands the attack of fuming nitric acid. By increasing the boron trichloride-phosphine ratio any of the still higher boron phosphides, e.g., $B_{10}P$, $B_{20}P$, $B_{40}P$, $B_{70}P$ or $B_{100}P$ may be obtained and used.

Example 29

Figure 3:
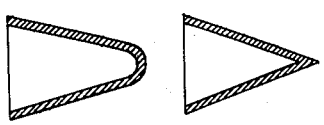
FIGURE 3 illustrates nose cones suitable for use in a rocket, missile or space ship. This figure illustrates two embodiments of such nose cones, viz. the blunt and needle form nose cone, respectively.

The formation of a nose cone or ogive, such as is shown in FIGURE 3, is carried out by thermally transforming a mass of pulverulent boron phosphine, BP, to one of the higher boron phosphides, e.g., $B_{100}P$. A form is provided for the hot pressing of the boron phophides to the desired shape at a temperature of about 2000° C. It is also found that about 5% of elemental boron may be admixed with the boron phosphide before the sintering in order to improve the bonding between the individual particles. The hot pressing operation, conducted with either of the two mixes, is found to yield a dense, smooth nose cone, which, when tested with a combustion flame at 2000° C. is found to be unaffected by the temperature or the combustion gases as well as the abrasive character of the high velocity gas stream.

Example 30

Figure 4:
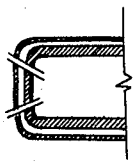
FIGURE 4 illustrates in cross-section a liner comprising a crystalline boron phosphide having a boron-phosphorus ratio of at least 6 to 1 as the internal element within the combustion chamber of a rocket. This combustion chamber is provided with two inlet lines for the introduction of fuels and/or oxidizing agents.

The combustion lining section of a rocket engine, such as is shown in FIGURE 4, is made by first fabricating a cylindrical section from elemental boron which is made by utilizing an inner and outer graphite form of the desired diameter and filling the space between these two graphite cylinders with uncompacted elemental boron of 325 mesh particle size. The graphite forms, with the boron between them, are then placed in a high temperature furnace and heated to about 1200° C. Provision is made to direct a stream of elemental phosphorus vapor pressure (6 mm. partial pressure; balance nitrogen) into the space between the two graphite forms, thus permitting a chemical reaction to occur with the elemental boron. It is found that a transformation occurs with the development of a crystalline product which is found to have the approximate composition of $B_7P$ with the substantially complete conversion of the elemental boron.

By increasing the boron content with respect to phosphorus, higher crystalline boron phosphides having the formulas, e.g., $B_{10}P$, $B_{20}P$, $B_{40}P$, $B_{70}P$ or $B_{100}P$ or higher may be obtained. These products are non-porous and hard and rocket engine liners comprised thereof withstand temperatures of the order of 2000° to 2300° C.

Example 31

Figure 5:
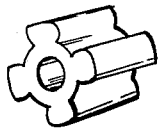
FIGURE 5 shows a perspective view of a gear pump impeller made of the new crystalline boron phosphides typified by the compound $B_6P$.

The formation of a gear pump impeller, such as is shown in FIGURE 5 is carried out by making use of molybdenum prototype form of the desired impeller. This form is suspended in an electric furnace maintained at about 1225° C. Provision is made for the introduction of a stream of boron trichloride elemental phosphorus and hydrogen. The three reactants: (1) boron, as $BCl_3$; (2) hydrogen and (3) phosphorus (calculated as $P_4$) are introduced in gaseous form in the relative molar proportions of 0.93:0.06:0.01 with the system being at substantially atmospheric pressure. A chemical reaction is found to occur with the formation of the crystalline form of boron phosphide, approximately $B_6P$ as a coating on the molybdenum. This provides a dense and uniformly thick layer which is resistant against abrasion and is stable at very high temperatures. Higher boron phosphides are obtained in the same manner by increasing the quantity of boron reactant.

Example 32

Figure 6:
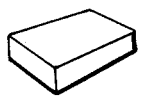
FIGURE 6 illustrates a wear plate, such as may be employed in a number of relationships for the impingement of high velocity gas streams. This element, which is made of a crystalline boron phosphide having a boron-to-phosphorus ratio of at least 6 to 1 may be employed, for example, as a stator in a turbine.

The manufacture of wear plates, such as shown in FIGURE 6 from the new crystalline boron phosphides is carried out by first forming a plate in a mold of the desired shape from 73.5% by weight of powdered ferroboron and 26.5% powdered ferrophosphorus. This shape is then placed in a furnace and subjected to a temperature of about 1300° C. At the completion of the transformation it is found that the boron phosphide approximately $B_6P$ exists in a matrix of iron so as to provide a wear-resistant surface. In this material the $B_6P$ is dispersed throughout the iron. This is desirable in the manufacture of abrasion-resistant exhaust baffles in turbine and pump components of a rocket engine. By increasing the proportion of ferroboron, higher boron phosphides likewise result.

Example 33

Figure 7:
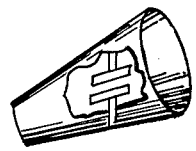
FIGURE 7 illustrates jet elevators comprising one of the new crystalline boron phosphides. In this figure the two jet elevator elements are located within the exhaust tail of a rocket, missile or space ship, the said elements being provided with pivoting means in order to permit external control of the jet elevators.

The fabrication of jet elevators for a rocket, as shown in FIGURE 7, is carried out by using a graphite prototype of the desired elevator form. This graphite model is placed in an electric furnace and subjected to a temperature of about 1200° C. while being enveloped in convergent jets of boron trichloride, phosphorus vapor and hydrogen in the relative proportion of 0.93:0.06 (calculated as $P_4$) and 0.001 by volume. It is found, that a chemical reaction occurs between the boron trichloride, the phosphorus and the hydrogen with the formation of a thin, uniform layer of crystalline boron phosphide having the formula $B_6P$ on the graphite. The by-product of this reaction is hydrogen chloride in vapor form which is readily removed from the reaction zone. The crystalline boron phosphide layer is very hard and is resistant to attack by fuming nitric acid, standard nitric acid at their boiling point, and to inorganic nitrates at temperatures up to 1000° C. Again, by increasing the ratio of the boron reactant, higher boron phosphides are obtained.

Example 34

Figure 8:
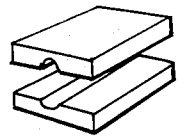
FIGURE 8 illustrates a pair of bearing elements comprised of the new crystalline boron phosphides. These bearing parts provide for a shaft to be journaled therebetween.

The manufacture of a bearing of the crystalline form of boron phosphide, having the formula $B_6P$, such as is shown in FIGURE 8 is carried out by first making a prototype of the desired bearing from powdered boron phosphide, BP, mixed with elemental boron, the two components being in the molar ratio of 1:5. This bearing form is placed in an electric furnace and subjected to a temperature of about 1500° C. A chemical reaction occurs between the two components. The boron phosphide, approximately $B_6P$, which is thus formed has the shape of the desired bearing. The bearing thus produced is extremely hard and withstands wear even under conditions of high temperatures and corrosive atmospheres. Adding more boron to the BP results in higher boron phosphides.

Example 35

Figure 9:
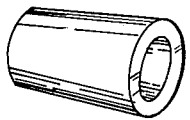
FIGURE 9 shows a porous tube of one of the new crystalline boron phosphides suitable for use in a sweat-cooling system.

The formation of a porous crystalline boron phosphide feed-line, such as is shown in FIGURE 9, is carried out by making use of an inner and outer mold of graphite. The space between the two molds having the desired cylindrical configuration of a feed-line is then filled with loosely compacted elemental boron powder. The graphite forms with the boron are then placed in an electric furnace and brought up to a tempearture of about 1300° C. A stream of phosphorus vapor (20 mm. partial pressure in an argon atmosphere) is then passed into the furnace, causing the transformation of the elemental boron into the crystalline form of boron phosphide having the formula $B_6P$. The product has minute residual voids in the fabricated piece, which has a porosity of about 30%. Higher boron phosphides are likewise obtained by appropriate adjustment of the temperature, pressure and quantity of phosphorus used.

The furnace is then cooled, after which the graphite molds are separated and the feed-line obtained as the desired article. This product has a porous structure which is of utility in making use of sweat or transpiration cooling, since the introduction of rocket fuel or other fluids, for example, water or alcohol, to the outer wall will exude or sweat out a small amount of the fluid through the porous walls of the feed-line. This results in the evaporation of such exuded fluid with a consequent cooling effect.

*Example 36*

Figure 10:
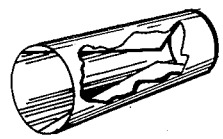
FIGURE 10 shows a cross-sectional view of a venturi throat which is intended to be used in a rocket engine. This throat must resist high temperatures and is therefore manufactured with a base form of graphite which is then coated with one of the new crystalline boron phosphides having the composition defined herein.

The fabrication of a venturi nozzle or combustion throat of the type shown in FIGURE 10 is carried out by using a prototype made of graphite. The prototype has a cylindrical external shape with an internal passage through which the combustion gases are drawn to reach a high velocity at the narrowest point of the venturi section. A coating of crystalline boron phosphide, approximately $B_6P$, is then deposited on the graphite prototype by utilizing the flame spraying process. This is carried out by introducing a supply of finely-divided boron phosphide ($B_6P$) powder (about 100 mesh) into the flame of an oxy hydrogen torch. This torch is directed towards the inner surface of the said nozzle, thereby heating the graphite form and at the same time depositing the finely-divided crystalline boron phosphide. In this way, a smooth, continuous surface of crystalline boron phosphide, approximately $B_6P$, is obtained in the desired shape and with a thickness of about 0.01 inch from the flame. The same procedure is applicable to higher boron phosphides.

*Example 37*

Figure 11:
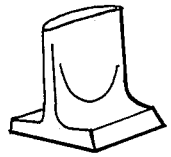
FIGURE 11 shows a turbine blade or bucket suitable for use in a high temperature combustion engine. This bucket is formed from a prototype base of molybdenum or other refractory metal such as tungsten or tantalum and is then coated with a crystalline boron phosphide having the composition defined herein.

A reinforced turbine blade or "bucket" (FIGURE 11) suitable for high temperature operation is made by first using a molybdenum base prototype of the desired bucket shape upon which the crystalline boron phosphide having the formula $B_6P$ is to be deposited. The prototype is placed in a furnace and heated to a temperature of about 1200° C. A jet of boron trichloride and another jet of phosphine (relative proportions by volume: 6.985 $BCl_3$ and 0.015 $PH_3$) are directed into the furnace to impinge on the heated molybdenum bucket form. It is found that a uniform coating of crystalline boron phosphide, approximately $B_6P$ is built up on the form, thus completely covering the molybdenum base.

It is also found that the boron phosphide is obtained when the boron source is first applied to the base material, e.g., $BCl_3$, reduced by hydrogen or sodium on the molybdenum to build up a base coat of elemental boron. The phosphorus source, e.g., $PH_3$ (or elemental phosphorus) is then separately applied to transform the boron to the desired boron phosphide.

By the same procedure, again increasing the quantity of the boron source with respect to the phosphorous source, the higher boron phosphides are also produced and used.

It will be understood by those skilled in the art that various modifications of this invention may be made without departing from the spirit and scope thereof.

I claim:

1. Process for the preparation of a boron phosphide having a boron-to-phosphorus ratio within the range of from 6:1 to 100:1 which comprises contacting a mixture of elemental boron and elemental phosphorus at a temperature within the range of 800° C. and 2100° C. and a pressure within the range of 1 micron to 100 atmospheres to form a boron phosphide within the said ratio, maintaining the phosphorus partial pressure less than the decomposition pressure of BP at ambient temperatures, continuing heating the resultant boron phosphide at a temperature sufficient to drive off any phosphorus present in excess of that required for the ultimately desired boron phosphide within said ratio, cooling the product and recovering the boron phosphide having the desired boron-phosphorus ratio within said range.

2. Process for the preparation of a boron phosphide having a boron-to-phosphorus ratio within the range of from 6:1 to 100:1 which comprises contacting at temperatures within the range of 800° C. to 2100° C. and pressures within the range of 1 micron to 100 atmospheres the boron phosphide, BP, with an excess of elemental boron to form a higher boron phosphide within the said ratio, maintaining the phosphorus partial pressure less than the decomposition pressure of BP at ambient temperatures, continuing heating the resultant boron phosphide at a temperature sufficient to drive off any phosphorus present in excess of that required for the ultimately desired higher boron phosphide within said ratio, cooling the product and recovering the boron phosphide having the desired boron-to-phosphorus ratio within said range.

3. Process for the preparation of a boron phosphide having a boron-to-phosphorus ratio within the range of from 6:1 to 100:1 which comprises contacting boron trichloride with elemental phosphorus in the presence of hydrogen at temperatures within the range of 800° C. to 2100° C. and pressures within the range of 1 micron to 100 atmospheres, to form a boron phosphide within the said ratio, maintaining the phosphorus partial pressure less than the decomposition pressure of BP at ambient temperatures, continuing heating the resultant boron phosphide at a temperature sufficient to drive off any phosphorus in excess of that required for the ultimately desired boron phosphide within said ratio, cooling the product and recovering the boron phosphide having the desired boron-to-phosphorus ratio within said range.

4. Process for the preparation of a boron phosphide having a boron-to-phosphorus ratio within the range of from 6:1 to 100:1, which comprises contacting at temperatures within the range of 800° C. to 2,100° C. a metal phosphide and a metal boride in an inorganic matrix to form the said boron phosphide, maintaining the phosphorus partial pressure less than the decomposition pressure of BP at ambient temperatures, and thereafter cooling the said matrix to crystallize the said boron phosphide in the said matrix, and dissolving the said matrix in a mineral acid to isolate the said boron phosphide.

5. Process for the preparation of a boron phosphide having a boron-to-phosphorus ratio within the range of from 6:1 to 100:1, which comprises contacting a boron halide with phosphine at a temperature of from 800° C. to 2100° C. to obtain the said boron phosphide, maintaining the phosphorus partial pressure less than the decomposition pressure of BP at ambient temperatures, and thereafter collecting the said boron phosphide on a solid surface.

6. Process according to claim 1 wherein the formed boron phosphide is $B_6P$.

7. Process according to claim 2 wherein the formed boron phosphide is $B_6P$.

8. Process according to claim 3 wherein the formed boron phosphide is $B_6P$.

9. Process according to claim 4 wherein the formed boron phosphide is $B_6P$.

10. Process according to claim 5 wherein the said boron phosphide is $B_6P$.

11. Process for the preparation of boron phosphides having a boron-to-phosphorus ratio within the range of from 6:1 to 100:1 which comprises heating a boron phosphide having a given boron-to-phosphorus ratio within said range at temperatures within the range of 800° C. to 2100° C. and pressures of from 1 micron to 100 atmospheres until the heated boron phosphide has undergone a phosphorus loss sufficient to produce boron phosphides having higher boron-to-phosphorus ratios within said range, the specific weight loss depending upon the particular boron-phosphorus ratio desired, cooling the product and recovering the boron phosphide having the desired boron-to-phosphorus ratio within said range.

12. Process for the preparation of the boron phosphide having the formula $B_{20}P$ which comprises heating the boron phosphide $B_6P$ at a temperature of 1525° C. and 1 atmosphere pressure until the $B_6P$ has undergone a phosphorus loss of 22.61 weight percent, cooling and recovering the resultant boron phosphide having the formula $B_{20}P$.

13. Process for the preparation of the boron phosphide having the formula $B_{70}P$ which comprises heating the boron phosphide $B_6P$ at a temperature of 1525° C. and 1 atmosphere pressure until the $B_6P$ has undergone a phosphorus loss of 29.53 weight percent, cooling and recovering the resultant boron phosphide having the formula $B_{70}P$.

14. Process for the preparation of the boron phosphide having the formula $B_{100}P$ which comprises heating the boron phosphide $B_6P$ at a temperature of 1525° C. and 1 atmosphere pressure until the $B_6P$ has undergone a phosphorus loss of 30.36 weight percent, cooling and recovering the resultant boron phosphide having the formula $B_{100}P$.

15. Process for the production of shaped objects of a boron phosphide having a boron-to-phosphorus ratio within the range of from 6:1 to 100:1, which comprises forming a mass of crystalline powder of the boron phosphide having the formula BP, together with elemental boron, into the desired shape, and thereafter heating the said shaped object at a temperature of from 800° C. to 2100° C., maintaining the phosphorus partial pressure less than the decomposition pressure of BP at ambient temperatures, to transform the said mixture to a crystalline product having a boron-to-phosphorus ratio within said range.

16. Process for the production of shaped objects of a boron phosphide having a boron-to-phosphorus ratio within the range of from 6:1 to 100:1, which comprises forming a mass of cubic crystalline boron phosphide having the formula BP, into the desired shape, and thereafter heating the said shaped object at a temperature of from 800° C. to 2100° C., maintaining the phosphorus partial pressure less than the decomposition pressure of BP at ambient temperatures, to evolve sufficient phosphorus to transform the said BP into a crystalline product having a boron-to-phosphorus ratio within said range.

17. Composition of matter consisting essentially of the crystalline boron phosphides having boron-to-phosphorus ratios within the range of from 6:1 to 100:1.

18. Composition of matter consisting essentially of the crystalline boron phosphide having the formula $B_6P$.

19. Composition of matter consisting essentially of the crystalline boron phosphide having the formula $B_{20}P$.

20. Composition of matter consisting essentially of the crystalline boron phosphide having the formula $B_{70}P$.

21. Composition of matter consisting essentially of the crystalline boron phosphide having the formula $B_{100}P$.

22. A shaped article of crystalline boron phosphide having a boron-to-phosphorus ratio within the range of from 6:1 to 100:1.

23. Process for the preparation of a boron phosphide having a boron-to-phosphorus ratio within the range of from 6:1 to 100:1 which comprises:

(a) contacting at temperatures within the range of from 800° C. to 2100° C. and pressures within the range of from 1 micron to 100 atmospheres, a boron source selected from the group consisting of elemental boron, boron carbide, boron halides, borate ores, ferroboron and the borides of iron, magnesium, aluminum, copper, titanium, zirconium and vanadium, with a phosphorus source selected from the group consisting of elemental phosphorus, phosphine, phosphorus halides, phosphate ores, ferrophosphorus and the phosphides of aluminum, magnesium, copper, titanium, iron, chromium, manganese, vanadium, zirconium, molybdenum, tantalum and thorium, to provide from 6 to 100 molar parts boron and 1 molar part phosphorus to form a boron phosphide within the said ratio, provided that when said source and said phosphorus source are halides and ores, a reducing agent therefor is present, (b) maintaining the partial pressure of phosphorus less than the decomposition pressure of BP at ambient temperatures, (c) continuing heating the resultant boron phosphide at a temperature sufficient to drive off any phosphorus present in excess of that required for the desired boron phosphide within the said boron-to-phosphorus ratio, and (d) cooling the system to obtain rhombohedral crystals of said boron phosphide within the said boron-to-phosphorus ratio.

24. Process according to claim 23 wherein said boron source and said phosphorus source are reacted together in a molten matrix selected from the group consisting of molten metal and salts thereof, said metal being selected from the group consisting of aluminum, magnesium, copper, titanium, chromium, manganese, vanadium, zirconium, molybdenum, tantalum, thorium, iron, nickel, lead, tin, antimony, bismuth, zinc and mixtures thereof.

25. Composition of matter consisting essentially of a rhombohedral crystalline boron phosphide having a boron-to-phosphorus ratio within the range of 6:1 to 100:1 dispersed in a metal matrix.

26. Composition according to claim 25 wherein said metal matrix is selected from the group consisting of aluminum, magnesium, copper, titanium, chromium, manganese, vanadium, zirconium, molybdenum, tantalum, thorium, iron, nickel, lead, tin, antimony, bismuth, zinc and mixtures thereof.

27. Composition according to claim 26 wherein said metal is iron.

28. Rhombohedral $B_6P$ dispersed in an iron matrix.

29. Process for the preparation of a rhombohedral boron phosphide having a boron-to-phosphorus ratio within the range of from 6:1 to 100:1 which comprises heating BP at temperatures within the range of from 800° C. to 2100° C. and pressures of from 1 micron to 100 atmospheres while maintaining the phosphorus partial pressure less than the decomposition pressure of BP at ambient temperatures, continuing heating to drive off any phosphorus in excess of that required for the desired boron phosphide within said ratio, cooling the system and recovering the said rhombohedral boron phosphide.

30. Process according to claim 29 wherein said rhombohedral boron phosphide is $B_6P$.

31. Process acording to claim 29 wherein said boron phosphide is $B_{6.5}P$.

32. Composition of matter consisting essentially of the crystalline boron phosphide having the formula $B_{6.5}P$.

References Cited by the Examiner

Mellor: Comprehensive Treatise on Inorganic and Theoretical Chemistry, vol. 8, pages 844–45.

Popper et al.: Nature, volume 179, pages 1075, 1957.

TOBIAS E. LEVOW, *Primary Examiner.*

JOHN H. MACK, *Examiner.*

J. E. POER, *Assistant Examiner.*